(12) United States Patent
Kawano et al.

(10) Patent No.: US 11,743,492 B2
(45) Date of Patent: Aug. 29, 2023

(54) INFORMATION PROCESSING APPARATUS, INFERENCE EXECUTION CONTROL METHOD, AND STORAGE MEDIUM

(71) Applicant: FUJITSU LIMITED, Kawasaki (JP)

(72) Inventors: Miho Kawano, Hamamatsu (JP); Ryuichi Matsukura, Kawasaki (JP); Takahisa Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/568,338

(22) Filed: Jan. 4, 2022

(65) Prior Publication Data

US 2022/0312031 A1 Sep. 29, 2022

(30) Foreign Application Priority Data

Mar. 26, 2021 (JP) ................................ 2021-053053

(51) Int. Cl.
*H04N 19/573* (2014.01)
*H04N 19/142* (2014.01)
*H04N 19/42* (2014.01)

(52) U.S. Cl.
CPC ......... *H04N 19/573* (2014.11); *H04N 19/142* (2014.11); *H04N 19/42* (2014.11)

(58) Field of Classification Search
CPC .... H04N 19/573; H04N 19/142; H04N 19/42; H04N 21/44008; Y02D 10/00
See application file for complete search history.

(56) References Cited

U.S. PATENT DOCUMENTS

| 2002/0047936 A1 | 4/2002 | Tojo |
| 2018/0089528 A1 | 3/2018 | Chan et al. |
| 2019/0147279 A1* | 5/2019 | Liu .................. G06V 30/19173 382/181 |
| 2020/0410322 A1* | 12/2020 | Naphade ................ G06N 7/005 |
| 2022/0051093 A1* | 2/2022 | Skaljak .................. G06N 3/084 |

FOREIGN PATENT DOCUMENTS

| JP | 2002-099917 A | 4/2002 |
| JP | 2018-056990 A | 4/2018 |

* cited by examiner

*Primary Examiner* — Tracy Y. Li
(74) *Attorney, Agent, or Firm* — STAAS & HALSEY LLP

(57) ABSTRACT

An information processing apparatus includes processors configured to execute inference processing using a GPU on frames of a moving image through each application for each of a plurality of applications, acquire a first degree of similarity between a target frame and a frame at a time of execution of previous inference processing, acquire a second degree of similarity between the target frame and an immediately preceding frame that is executed after the previous inference processing, set a constraint on execution of inference processing for the target frame having a throughput larger than a certain value when a number of frames accumulated in a queue that is used for waiting for the execution of the inference processing and accumulates frames exceeds a certain number, and determine whether to execute the inference processing for the target frame based on the first degree, the second degree, and whether the constraint presents.

4 Claims, 16 Drawing Sheets

| APPLICATION ID | API EXECUTION THROUGHPUT [fps] | INFERENCE TIME FRAME RATE [fps] | FRAME STATUS | CONSTRAINT STATE |
|---|---|---|---|---|
| appA | 10 | 1 | DURING INFERENCE | - |
| appB | 8 | 1 | WAITING FOR IN QUEUE | - |
| appC | 9 | 1 | WAITING FOR IN QUEUE | - |
| appD | 1 | 0.5 | - | PRESENCE |
| ... | ... | ... | ... | ... |

FIG. 7B

FRAME RATE CONTROL UNIT

WHEN WAITING TIME OF CURRENT QUEUE LENGTH IS BASED ON 200 ms → 5 fps

CONSTRAINT STATE INFORMATION ⌐30

| APPLICATION ID | API EXECUTION THROUGHPUT [fps] | INFERENCE EXECUTION FRAME RATE [fps] | FRAME STATUS | CONSTRAINT STATE ⌐34 |
|---|---|---|---|---|
| appA | 10 | 1 | DURING INFERENCE | - |
| appB | 8 | 1 | WAITING FOR IN QUEUE | - |
| appC | 9 | 1 | WAITING FOR IN QUEUE | - |
| appD | 1 < 5fps | 0.5 | - | - |
| appE | 15 > 5fps | 0.5 | - | PRESENCE |
| appF | 6 > 5fps | 0.5 | - | PRESENCE |
| ... | ... | ... | ... | ... |

{ DOES NOT IMPOSE CONSTRAINT ON INFERENCE

{ IMPOSE CONSTRAINT ON INFERENCE

⌐31 QUEUE MONITORING UNIT → ⌐32 CONSTRAINT DECISION UNIT

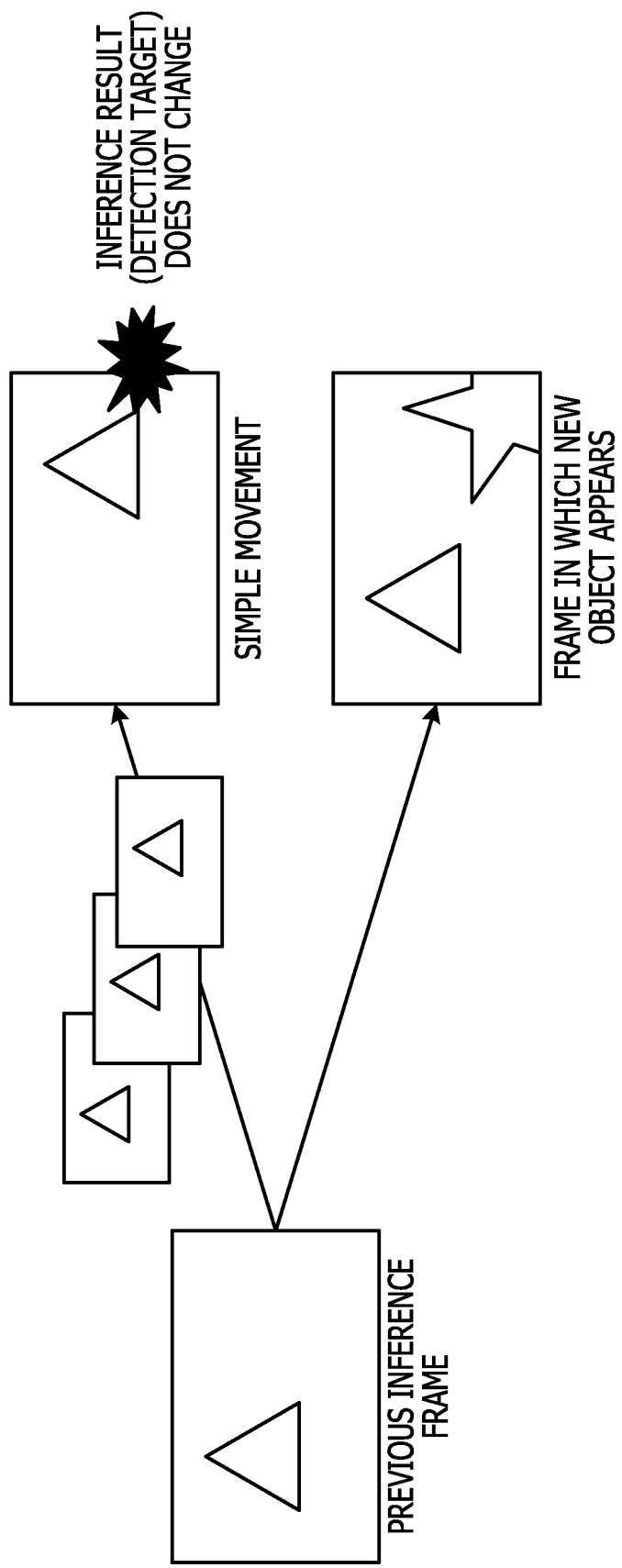

INFORMATION PROCESSING APPARATUS, INFERENCE EXECUTION CONTROL METHOD, AND STORAGE MEDIUM

CROSS-REFERENCE TO RELATED APPLICATION

This application is based upon and claims the benefit of priority of the prior Japanese Patent Application No. 2021-53053, filed on Mar. 26, 2021, the entire contents of which are incorporated herein by reference.

FIELD

The embodiment discussed herein is related to an information processing apparatus, an inference execution control method, and a storage medium.

BACKGROUND

In recent years, systems that execute analysis processing of a video by using a graphical processing unit (GPU) have been increasing. For example, there is an inference execution system that executes inference processing such as object detection on frames of a moving image through an inference execution application programming interface (API) of an application. In such an inference execution system, the inference processing is executed on all arrived frames.

However, when the inference processing is executed on all the arrived frames, the GPU may be occupied by the inference processing on a frame with a small change in content.

A technique for selecting a frame that is not most similar to a candidate frame by calculating a similarity distance between frames has been disclosed. Due to the use of such a technique, it is conceivable to reduce the number of frames in which the inference processing is executed by calculating degrees of similarity between the frames of the moving image, specifying a similar frame of which an inference result is considered not to change from the inference result at the time of immediately preceding inference processing, and not performing the execution of the inference processing on the similar frame. As a result, the GPU may be inhibited from being occupied by the inference processing of the frame with the small change in content.

Japanese Laid-open Patent Publication Nos. 2018-056990 and 2002-099917 are disclosed as related art.

SUMMARY

According to an aspect of the embodiments, an information processing apparatus includes one or more memories; and one or more processors coupled to the one or more memories and the one or more processors configured to execute inference processing using a GPU on frames of a moving image through each application for each of a plurality of applications, acquire a first degree of similarity between a target frame and a frame at a time of execution of previous inference processing by calculating, acquire a second degree of similarity between the target frame and an immediately preceding frame that is executed after the previous inference processing by calculating, set a constraint on execution of inference processing for the target frame having a throughput larger than a certain value when a number of frames accumulated in a queue that is used for waiting for the execution of the inference processing and accumulates frames exceeds a certain number, and determine whether or not to execute the inference processing for the target frame based on the first degree of similarity, the second degree of similarity, and whether the constraint presents.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7B is a diagram (2) that illustrates an example of the operation of the frame rate control unit according to the embodiment;

FIG. 13 is a diagram illustrating a problem of inference execution.

DESCRIPTION OF EMBODIMENTS

Even when the number of frames in which inference processing is executed based on a degree of similarity is reduced for each application, the number of frames to be used by a GPU may temporarily increase, and a throughput of an inference execution API of the application may decrease.

For example, in the execution of the inference processing of one application, even in a frame in which there is no change such as simple movement of an object in the frame, a degree of similarity between the frames decreases, and thus, the frame may not be skipped. As a result, the GPU is occupied, and the throughput of the inference execution API of the application is reduced.

In the execution of the inference processing by a plurality of applications, the number of frames that are targets of the inference processing rapidly increases depending on the concentration of execution requests and the contents of the frames, and thus, a waiting time until the execution of the inference processing increases. As a result, the GPU is occupied, and the throughput of the inference execution API of the application is reduced.

According to an aspect of the present disclosure, it is an object to improve a throughput of an inference execution API of an application and increase usage efficiency of a GPU.

According to one embodiment, the throughput of the inference execution API of the application may be improved, and the usage efficiency of the GPU may be increased.

Hereinafter, the embodiment of an information processing apparatus, an inference execution control method, and an inference execution control program disclosed in the present application will be described in detail with reference to the drawings. The present disclosure is not limited by the embodiment.

Figure 11:
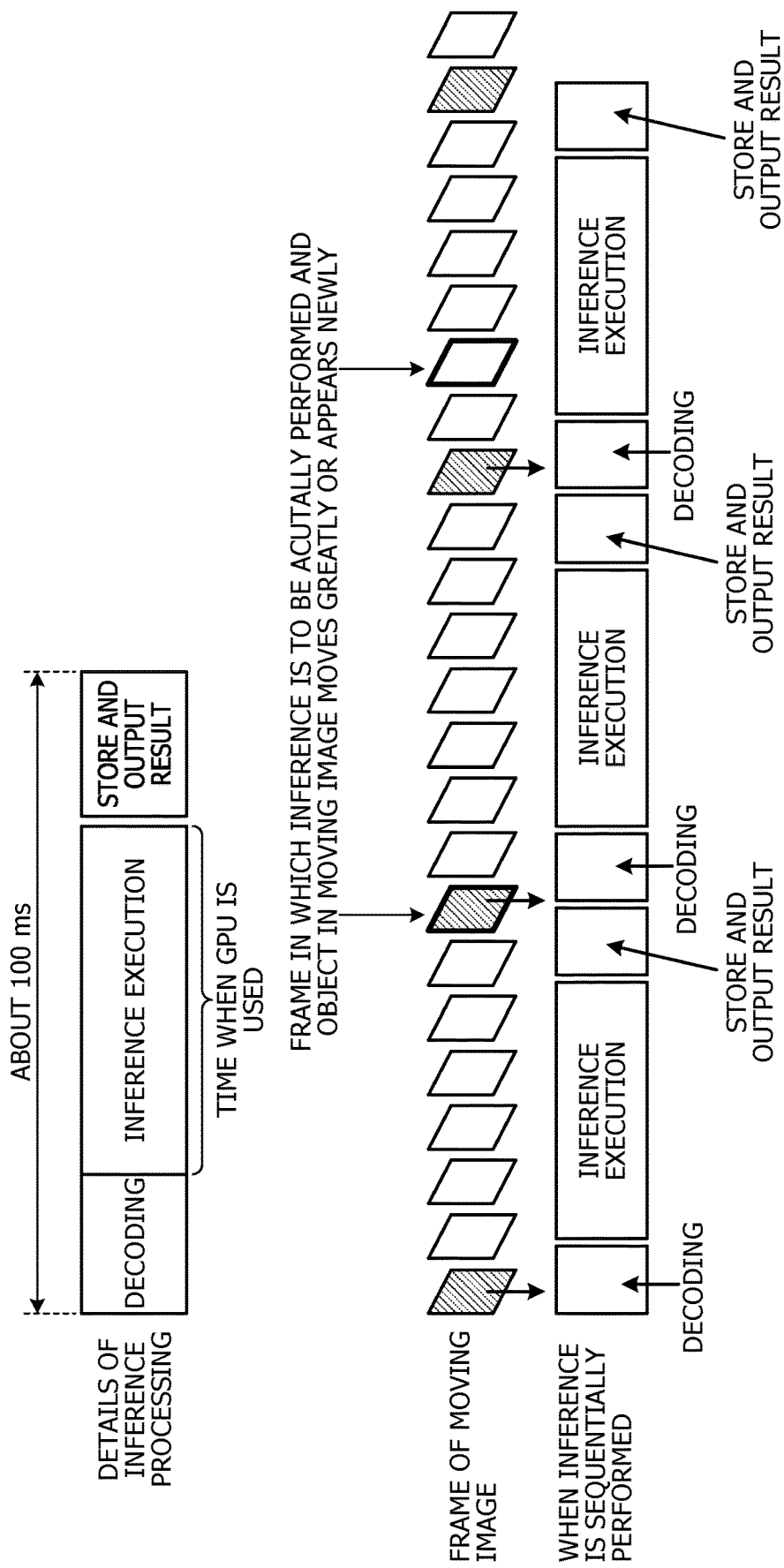
FIG. 11 is a reference diagram illustrating a frame in which inference is performed.

First, inference execution for a video using a GPU will be described with reference to FIGS. 11 and 12. FIG. 11 is a reference diagram illustrating a frame for which inference is to be performed. As illustrated in FIG. 11, when a frame of a moving image in a video arrives, an inference execution system sequentially executes inference processing on the arrived frame of the moving image. The inference processing includes decoding processing, inference execution processing using a GPU, and result storage and output processing. When such inference processing is executed for all arrived frames of the moving image, the GPU is occupied by the inference processing for a frame having a small change in content. For example, in the case of inference processing of detecting an object, the inference execution system may not process a frame in which an object desired to be detected appears at an appropriate time, and may cause a delay. The inference execution system has no free space in the GPU and is not able to detect an object of another moving image.

Accordingly, an inference execution system in which a degree of similarity of each frame of a moving image is calculated, a similar frame in which an inference result is considered not to change from an inference result obtained immediately preceding inference is specified, and the inference execution of the similar frame is not performed is conceivable. According to such an inference execution system, the number of frames in which the inference processing is executed may be reduced. For example, the inference execution system may execute the inference processing on a plurality of moving images by skipping the inference processing on the similar frame.

Figure 12:
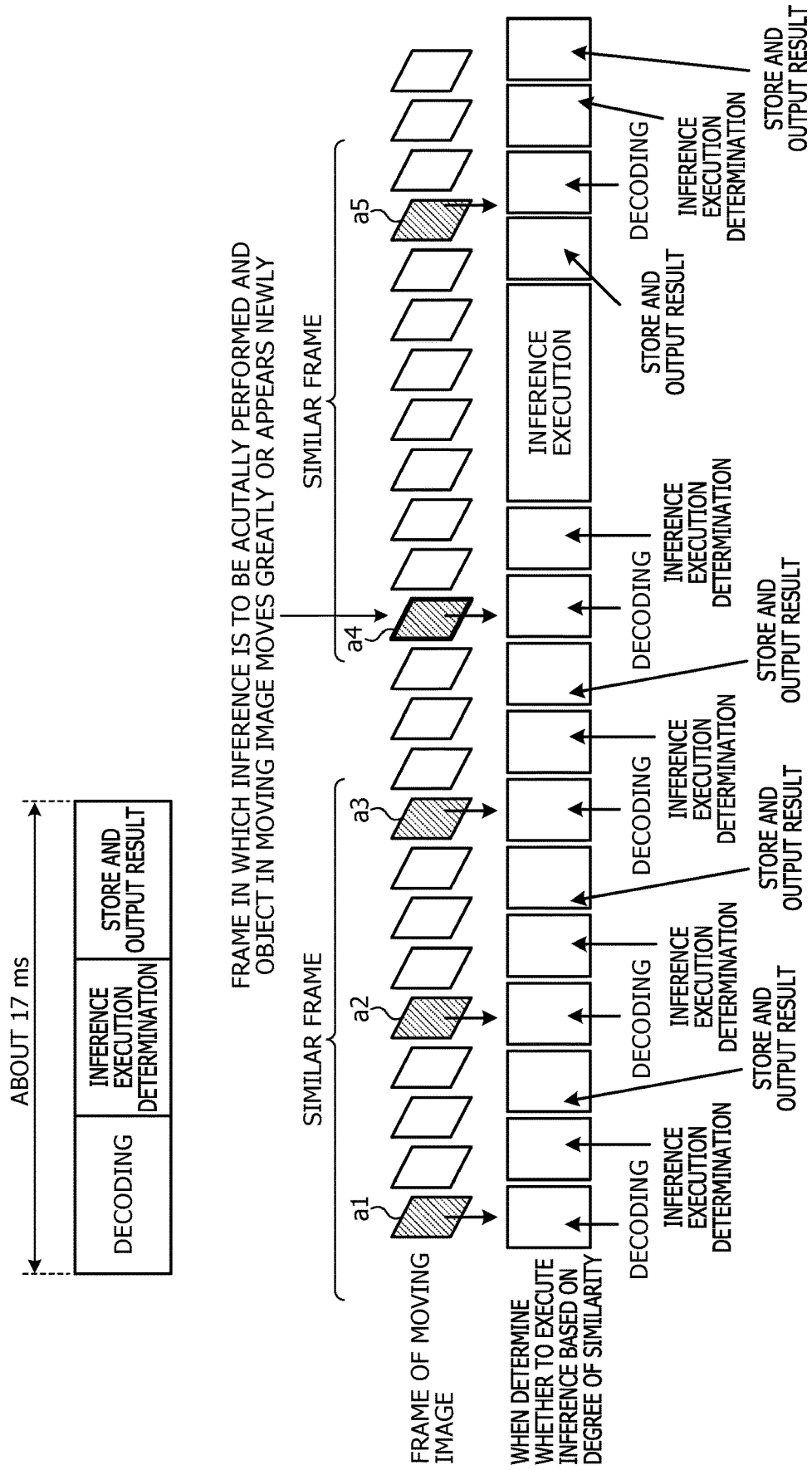
FIG. 12 is another reference diagram illustrating the frame in which the inference is performed.

FIG. 12 is another reference diagram illustrating the frame in which the inference is performed. As illustrated in FIG. 12, when a frame of a moving image in a video arrives, the inference execution system determines whether to execute the inference processing based on the degree of similarity between the arrived frame of the moving image and the frame in which the inference processing is executed immediately before. For example, the inference execution system acquires a hash value from each of the arrived frame and the frame in which the inference processing is executed immediately before, calculates a Hamming distance from each acquired hash value, and skips the inference processing on a frame having a distance equal to or shorter than a certain Hamming distance.

An image hashing algorithm may be adopted as a technique for acquiring the hash value. An example of the image hashing algorithm is Perceptual Hash. A close hash value is obtained when hash values are similar to each other so as to correspond to the movement of a target object and a change in luminance.

For two code strings (or character strings), the Hamming distance indicates the number of bits (digits) having different values by comparing corresponding bits (or digits). The Hamming distance may indicate similarity between two code strings (or character strings).

For example, when the Hamming distance from the hash value acquired from each of two frames is calculated by implementation in Python, the Hamming distance is as follows. It is assumed that a hash value of a frame a is "c497a48cb9b96969" and a hash value of a frame b is "c497a48cb9bb6968". Since "9" and "8" which are last digits are different from "9" and "b" of a digit five digits before the last digit, the Hamming distance is calculated as "2". As another example, it is assumed that the hash value of the frame a is "c497a48cb9b96968" and the hash value of the frame b is "c497a48cb9bb6968". Since the numerical values of all the digits coincide, the Hamming distance is calculated as "0". For example, when the Hamming distance is small, the degree of similarity is large and the change is small.

It is assumed that the inference processing for a frame a1 is executed. Thereafter, since a frame a2 is larger than the frame a1 in which the inference processing is executed immediately before by a certain Hamming distance, the inference processing on the frame a2 is executed. Since a frame a3 is larger than the frame a2 in which the inference processing is executed immediately before by a certain Hamming distance, the inference processing on the frame a3 is executed. Since a frame a4 is larger than the frame a3 in which the inference processing is executed immediately before by a certain Hamming distance, the inference processing on the frame a4 is executed. Since a frame a5 is larger than the frame a4 in which the inference processing is executed immediately before by a certain Hamming distance, the inference processing on the frame a5 is executed.

The inference execution system wants to execute the inference processing on a frame in which an object moves greatly or appears newly in a moving image. However, there is a problem that the number of frames to be used by the GPU temporarily increases when the inference execution system only skips the frame in which the inference processing is executed based on the degree of similarity. FIG. 13 is a diagram illustrating a problem of the inference execution. As illustrated in FIG. 13, in the execution of the inference processing of one application, even in a frame in which there is no change such as simple movement of an object (in this case, a triangle) in the frame, the Hamming distance between the frames becomes larger than a certain Hamming distance. Although the inference execution system wants to execute the inference processing on a frame in which a new object appears, the inference execution system executes the inference processing on a frame of simple movement that does not change as an inference result.

In the execution of the inference processing by a plurality of applications, the number of frames that are targets of the inference processing rapidly increases depending on the concentration of execution requests and the contents of the frames, and thus, a waiting time until the execution of the inference processing increases.

Hereinafter, a GPU server that increases the usage efficiency of the GPU that executes the inference processing will be described.

EMBODIMENT

[Functional Configuration of GPU Server]

Figure 1:
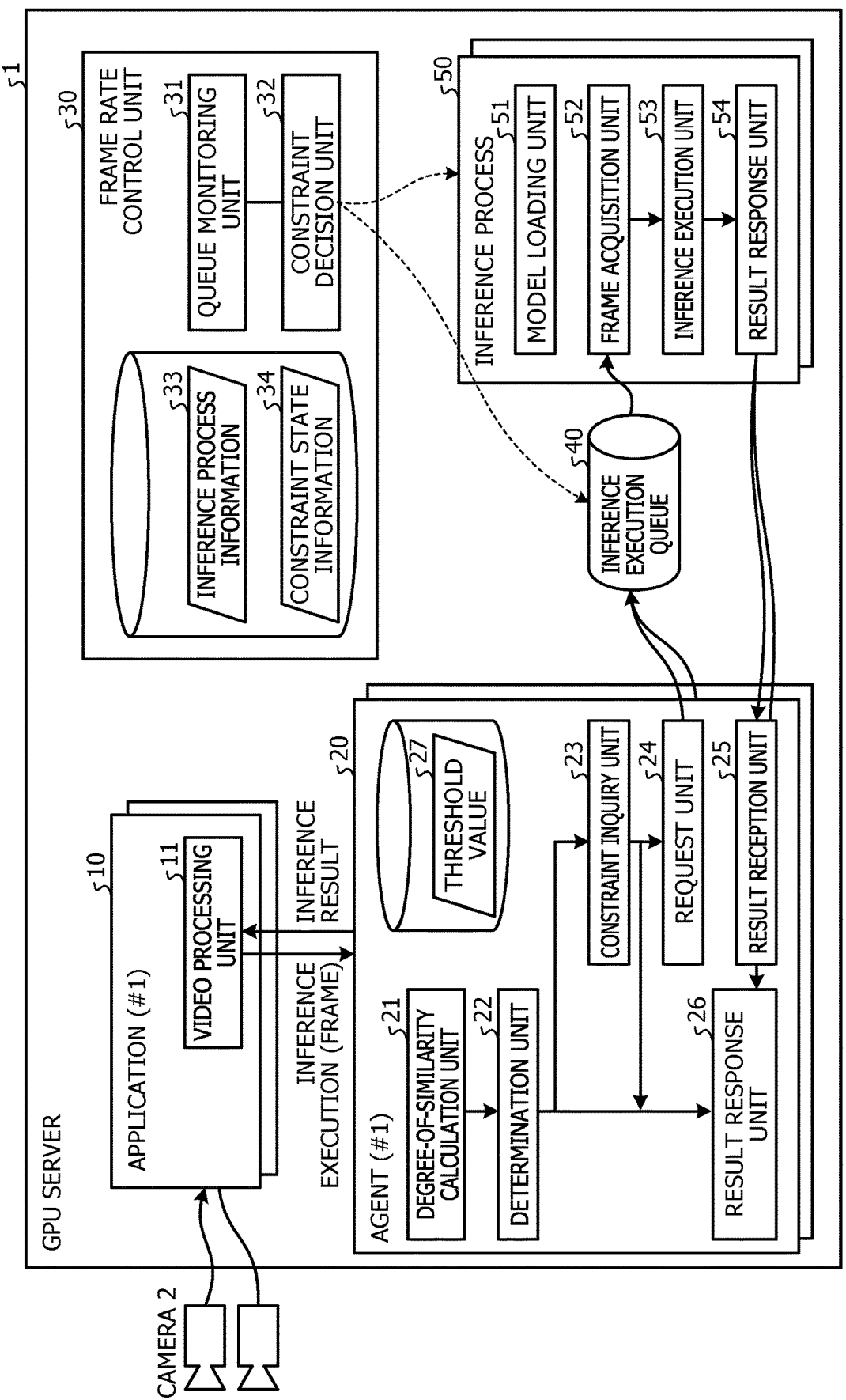
FIG. 1 is a block diagram illustrating an example of a functional configuration of a GPU server according to an embodiment.

FIG. 1 is a block diagram illustrating an example of a functional configuration of a GPU server according to an embodiment. A GPU server 1 illustrated in FIG. 1 executes inference processing using a GPU for each frame of a moving image (video). It is assumed that the GPU server 1 executes a plurality of tasks of inference processing over one graphics processing unit (GPU). For example, the inference processing referred to in this case is an application such as for detecting an object or estimating a traffic volume from a video (frames) output from cameras 2.

The GPU server 1 includes applications 10, agents 20, a frame rate control unit 30, an inference execution queue 40, and inference processes 50.

The application 10 performs processing on frames arriving from the cameras 2. The application 10 includes a video processing unit 11. Through an inference execution API, the video processing unit 11 delivers a frame in which inference processing is executed to the agent 20. The video processing unit 11 receives the inference result from the agent 20. A plurality of applications 10 are activated.

The agent 20 causes the inference process 50 to execute a target frame, receives the inference result, and delivers the inference result to the application 10. The agent 20 is activated for each application 10 by the inference execution API. The agent 20 includes a degree-of-similarity calculation unit 21, a determination unit 22, a constraint inquiry unit 23, a request unit 24, a result reception unit 25, and a result response unit 26.

The degree-of-similarity calculation unit 21 calculates a first degree of similarity between a target frame and a frame at the time of previous inference execution. For example, the degree-of-similarity calculation unit 21 acquires a hash value from the target frame. The degree-of-similarity calculation unit 21 acquires a hash value from a frame at the time of the previous inference execution. The degree-of-similarity calculation unit 21 calculates a Hamming distance from the hash value of each frame. An example of the technique for acquiring the hash value referred to in this case is Perceptual Hash. A close hash value is obtained when hash values are similar to each other so as to correspond to the movement of a target object and a change in luminance. The Hamming distance referred to in this case indicates the number of bits having different values by comparing corresponding bits for the bit strings of the two frames. The Hamming distance may indicate similarity between two frames. For example, as the Hamming distance increases, the degree of similarity decreases (change increases). In order to express that as the degree of similarity decreases, the change increases, the description will be given by converting the degree of similarity into a degree of change. The degree of similarity may be referred to as a priority in the sense that the inference processing is preferentially executed as the degree of change increases. As an example, the priority may be a reciprocal of the degree of similarity.

The degree-of-similarity calculation unit 21 calculates a second degree of similarity between the target frame and the immediately preceding frame. For example, the degree-of-similarity calculation unit 21 may calculate the second degree of similarity for the target frame and the immediately preceding frame in the same manner as in the case where the first degree of similarity is calculated.

The determination unit 22 determines whether or not the first degree of similarity is smaller than a first threshold value. For example, the determination unit 22 compares the first degree of similarity with a threshold value 27 of the degree of similarity, and determines whether or not there is a change equal to or larger than a certain value. When the first degree of similarity is smaller than the threshold value 27 (when there is the change equal to or larger than the certain value), the determination unit 22 proceeds to the constraint inquiry unit 23. When the first degree of similarity is equal to or larger than the threshold value 27 (when there is no change equal to or larger than the certain value), the determination unit 22 outputs, as the inference result, the result at the time of the previous inference execution to the result response unit 26.

When the determination unit 22 determines that the first degree of similarity is smaller than the threshold value 27 (when there is the change equal to or larger than the certain value), the constraint inquiry unit 23 determines whether or not there is a constraint in the application 10 of the target frame. For example, the constraint inquiry unit 23 inquires of the frame rate control unit 30 about a constraint state of the inference execution for the application 10 that outputs the target frame. The constraint inquiry unit 23 decides whether or not to perform inference execution based on the presence or absence of the constraint state of the inference execution obtained as the result of the inquiry. For example, when the acquired constraint state of the inference execution is "presence", the constraint inquiry unit 23 refers to the second degree of similarity with the immediately preceding frame, and decides to perform inference execution when the change in the short time is large. For example, when there is the constraint in the application 10 of the target frame, the constraint inquiry unit 23 gives priority to the inference execution of the target frame having the large change in the short time. This is because, in the case of the inference processing of detecting the object, there is a higher possibility that a new object appears in the frame having the large change in the short time. When the acquired constraint state of the inference execution is "presence" and also when the change in the short time is small, the constraint inquiry unit 23 decides not to perform inference execution. When the acquired constraint state of the inference execution is "absence", the constraint inquiry unit 23 decides to perform inference execution. For example, when there is not the constraint in the application 10 of the target frame, since there is the change equal to or larger than the certain value from the previous inference, the constraint inquiry unit 23 gives priority to the inference execution of the target frame. The constraint state is set by the frame rate control unit 30 to be described later.

The request unit 24 requests inference execution. For example, the request unit 24 registers, in the inference execution queue 40 corresponding to a target model of the application 10, the target frame determined to perform inference execution and the priority converted from each of the first degree of similarity and the second degree of similarity. The priority indicates a value such that as the degree of similarity decreases (the change increases), the priority of the inference execution increases.

The result reception unit 25 receives the inference result. For example, the result reception unit 25 receives the inference result from the inference process 50 that executes the inference processing on the target frame.

The result response unit 26 delivers, as a response, the inference result to the application 10. For example, the result response unit 26 delivers, as the response, the inference result received by the result reception unit 25 to the application 10. The result response unit 26 delivers, as the response, the inference result output by the determination unit 22 (result obtained at the time of the previous inference execution) to the application 10.

The frame rate control unit 30 controls a frame rate for each application 10. For example, the frame rate control unit 30 monitors the inference execution queue 40, and imposes a constraint in order to suppress the inference execution from the application 10 when the waiting time is long. The frame rate control unit 30 includes a queue monitoring unit 31, a constraint decision unit 32, inference process information 33, and constraint state information 34.

Figure 2:
FIG. 2 is a diagram illustrating an example of inference process information according to the embodiment.

The inference process information 33 stores information on the inference process 50. Since the inference process 50 is provided for each model, the inference process information 33 is set for each model in advance. An example of the inference process information 33 will be described with reference to FIG. 2. FIG. 2 is a diagram illustrating an example of the inference process information according to the embodiment. As illustrated in FIG. 2, the inference process information 33 includes a model ID, an ID of the inference execution queue 40, a queue length threshold value of the inference execution queue 40, and an average inference time. The model ID is an identifier for uniquely identifying a model used in the inference process 50. The inference execution queue ID is an identifier for uniquely identifying the inference execution queue 40 indicating a queue of frames in which the inference execution is performed by the inference process 50. The queue length threshold value is a threshold value of a queue length of the inference execution queue 40. The queue length threshold value may be smaller than a maximum threshold value of the queue length of the inference execution queue 40. The average inference time is an average time of inference times when inference execution is performed by the inference process 50.

Figure 3:
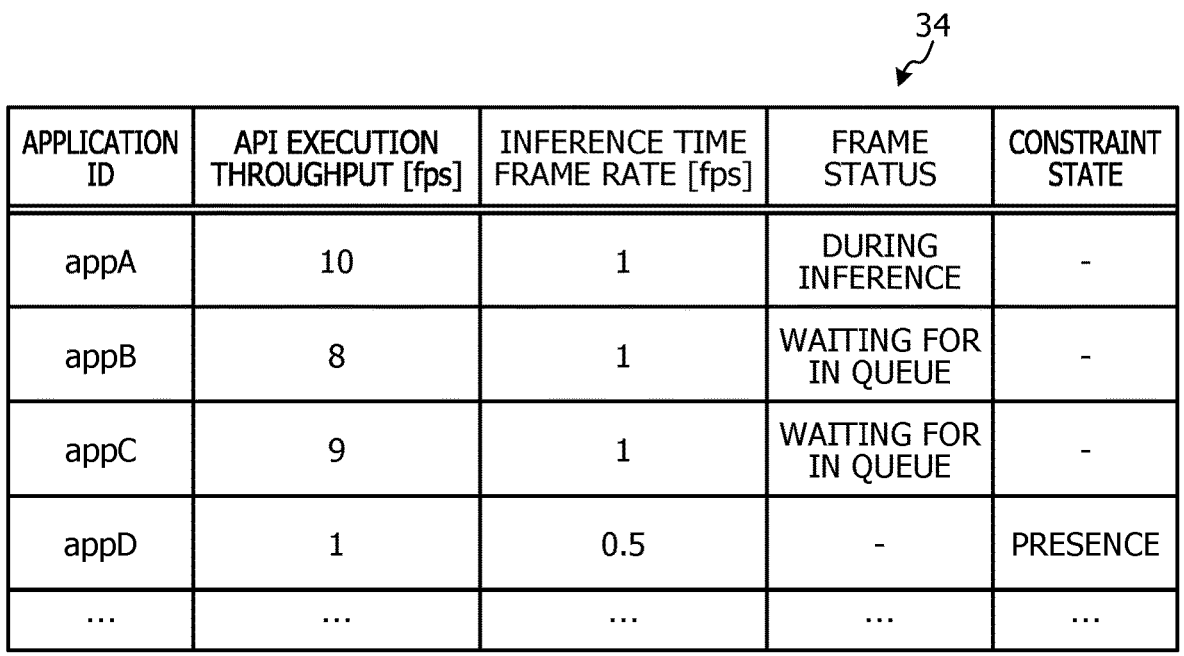
FIG. 3 is a diagram illustrating an example of constraint state information according to the embodiment.

Referring back to FIG. 1, the constraint state information 34 stores a constraint state for each application 10. The constraint state information 34 is provided for each model. An example of the constraint state information 34 will be described with reference to FIG. 3. FIG. 3 is a diagram illustrating an example of the constraint state information according to the embodiment. As illustrated in FIG. 3, the constraint state information 34 includes an application ID, an API execution throughput, an inference execution frame rate, a frame status, and a constraint state. The application ID is an identifier for uniquely identifying the application 10. The API execution throughput is a throughput of frames output from the application 10 through the inference execution API. For example, it may be said that the API execution throughput is the number of requests for the inference execution from the application 10. The throughput is represented by the number (fps: frames per second) of frames per second. The inference execution frame rate is a frame rate of a frame in which inference execution is performed. For example, it may be said that the frame rate is the number of times inference execution is actually performed. The frame rate is represented by the number of frames per second (fps). The frame status indicates a current execution state of a frame. As an example, the frame status includes "during inference" indicating that inference execution is being performed, "waiting" indicating that the frame is waiting in the inference execution queue 40, and "-" indicating the other cases. The constraint state indicates a constraint state for inference execution. The constraint state includes "presence" indicating that the constraint is imposed and "-" indicating that the constraint is not imposed. The constraint state is set by the constraint decision unit 32 to be described later.

Referring back to FIG. 1, the queue monitoring unit 31 monitors the inference execution queue 40. For example, the queue monitoring unit 31 periodically monitors the queue length of the inference execution queue 40 for each model. The queue monitoring unit 31 searches for the inference execution queue 40 in which the current queue length exceeds the queue length threshold value set for each model in the inference process information 33. A monitoring frequency may be a frequency equal to or smaller than a minimum inference time among inference times of inference processing using the model registered in the inference process information 33.

The queue monitoring unit 31 calculates a maximum waiting time from the current queue length for the found inference execution queue 40. As an example, the queue monitoring unit 31 calculates, as the maximum waiting time, a time obtained by multiplying the current queue length by the average inference time. As the average inference time, an average inference time of a model that is set in the inference process information 33 in advance and corresponds to the target inference execution queue 40 may be used.

For the inference execution queue 40 found by the queue monitoring unit 31, the constraint decision unit 32 decides to which application 10 a constraint is to be imposed.

For example, the constraint decision unit 32 refers to the API execution throughput of the constraint state information 34 corresponding to the target inference execution queue 40, and decides the application 10 for which inference execution is suppressed. As an example, when the maximum waiting time calculated from the current queue length is set as a period of the frame, the constraint decision unit 32 calculates an arrival frequency (throughput) of frames per second from the maximum waiting time. Such a calculated value is a specified value used for a constraint condition. When the maximum waiting time calculated from the current queue length is 200 ms, the specified value is calculated as 5 fps (=1000 ms/200 ms).

The constraint decision unit 32 refers to the API execution throughput of the constraint state information 34, and searches for an application ID larger than the specified value. The constraint decision unit 32 decides the found application ID as the application 10 for which inference execution is suppressed. When the throughput is larger than the specified value, the frame overflows from the inference execution queue 40 or is waiting for a long period of time. Thus, the constraint decision unit 32 decides to suppress the inference execution for the application 10 having a throughput larger than the specified value. The constraint decision unit 32 sets the constraint state corresponding to the target application ID of the constraint state information 34 to "presence". For example, the constraint decision unit 32 imposes a constraint on the application 10 in which the API execution throughput is expected to decrease due to the waiting in the inference execution queue 40. Here, when the current queue length falls below the queue length threshold value, the constraint decision unit 32 sets the constraint state to "-" in order to cancel the constraint.

The inference execution queue 40 is activated for each model used in the inference execution. The target frame and the priority converted from each of the first degree of similarity and the second degree of similarity output from the agent 20 are input, as one set, to the inference execution queue 40. At the time of inputting, the inference execution queue 40 inputs the frames while changing the order such that the frames having a smaller first degree of similarity and a smaller second degree of similarity are preferentially extracted. For example, the inference execution queue 40 inputs a target frame such that the target frame having a larger change (higher priority) from the frame at the time of the previous inference execution and a larger change (higher priority) from the immediately preceding frame is preferentially extracted.

The inference process 50 extracts frames accumulated in the inference execution queue 40 one by one, executes the inference processing, and returns the inference result to the agent 20. The inference process 50 is activated for each model used in the inference execution. The inference process 50 includes a model loading unit 51, a frame acquisition unit 52, an inference execution unit 53, and a result response unit 54.

The model loading unit 51 loads the model to be used in the inference execution from a storage unit that retains the model. The storage unit referred to in this case may be a storage unit (not illustrated) of the GPU server 1 or may be a storage unit outside the GPU server 1.

The frame acquisition unit 52 acquires a frame from a head of the inference execution queue 40 corresponding to the model.

The inference execution unit 53 executes the inference processing using the GPU on the acquired frame by using the loaded model.

The result response unit 54 transmits, as the response, the inference result to the agent 20.

[Hardware Configuration of GPU Server]

Figure 4:
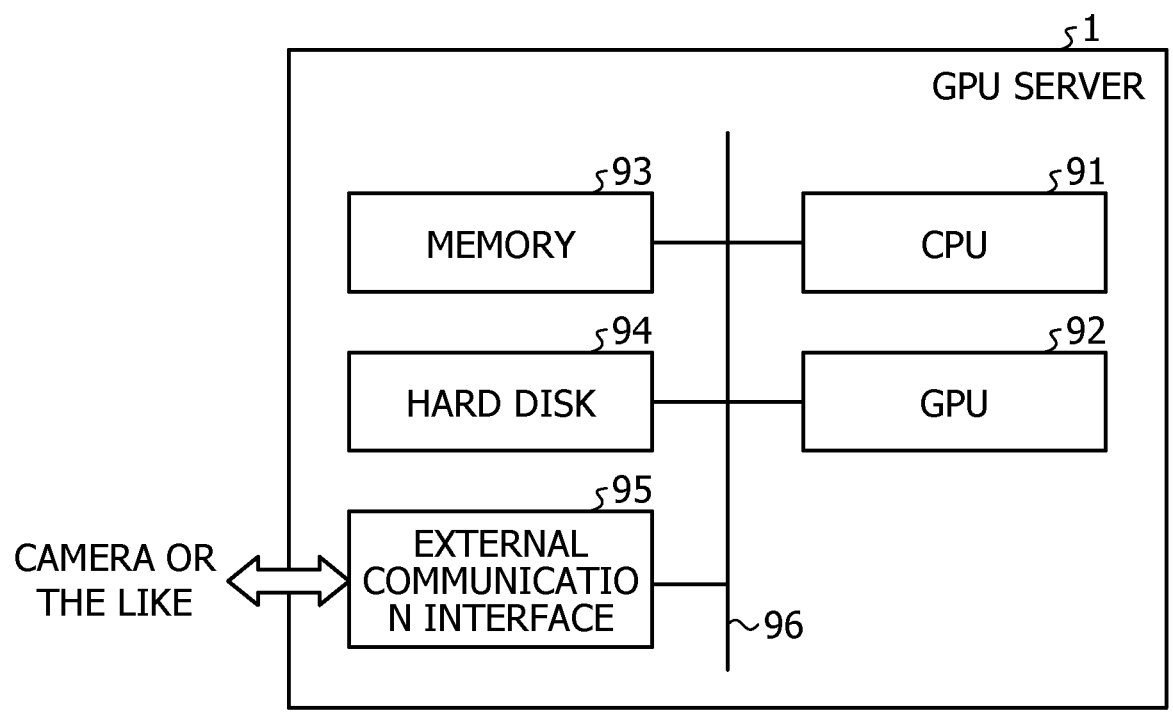
FIG. 4 is a diagram illustrating an example of a hardware configuration of the GPU server.

FIG. 4 is a diagram illustrating an example of a hardware configuration of the GPU server. Although the server is referred to as the GPU server 1 in the embodiment for the sake of convenience, the GPU server may be constructed by installing the GPU in a part of a general-purpose server.

As illustrated in FIG. 4, the GPU server 1 has a GPU 92 in addition to a central processing unit (CPU) 91. The GPU server 1 includes a memory 93, a hard disk 94, and an external communication interface 95. For example, the components illustrated in FIG. 4 are coupled to each other via a bus 96.

The external communication interface 95 is a network interface card or the like, and communicates with other apparatuses such as a camera and a storage server. The hard disk 94 stores a program for operating the functions illustrated in FIG. 1, the inference process information 33, and the like.

The CPU 91 operates a process of executing each function described in FIG. 1 by reading, from the hard disk 94 or the like, a program for executing the same processing as the processing of each processing unit illustrated in FIG. 1 and loading the program into the memory 93. For example, this process executes the same function as the function of each processing unit of the GPU server 1. For example, the CPU 91 reads, from the hard disk 94 or the like, a program having the same functions as the functions of the application 10, the agent 20, the frame rate control unit 30, the inference execution queue 40, the inference process 50, and the like. The CPU 91 executes a process of executing the same processing as the processing of the application 10, the agent 20, the frame rate control unit 30, the inference execution queue 40, the inference process 50, and the like.

The GPU 92 operates a process of executing a program for executing the inference processing of the inference execution unit 53 in the inference process 50 illustrated in FIG. 1 by reading the program from the hard disk 94 or the like and loading the program into the memory 93. The GPU 92 multiply operates the inference processing of the inference execution units 53 in the plurality of inference processes 50.

[Operation of Inference Execution Queue]

Figure 5:
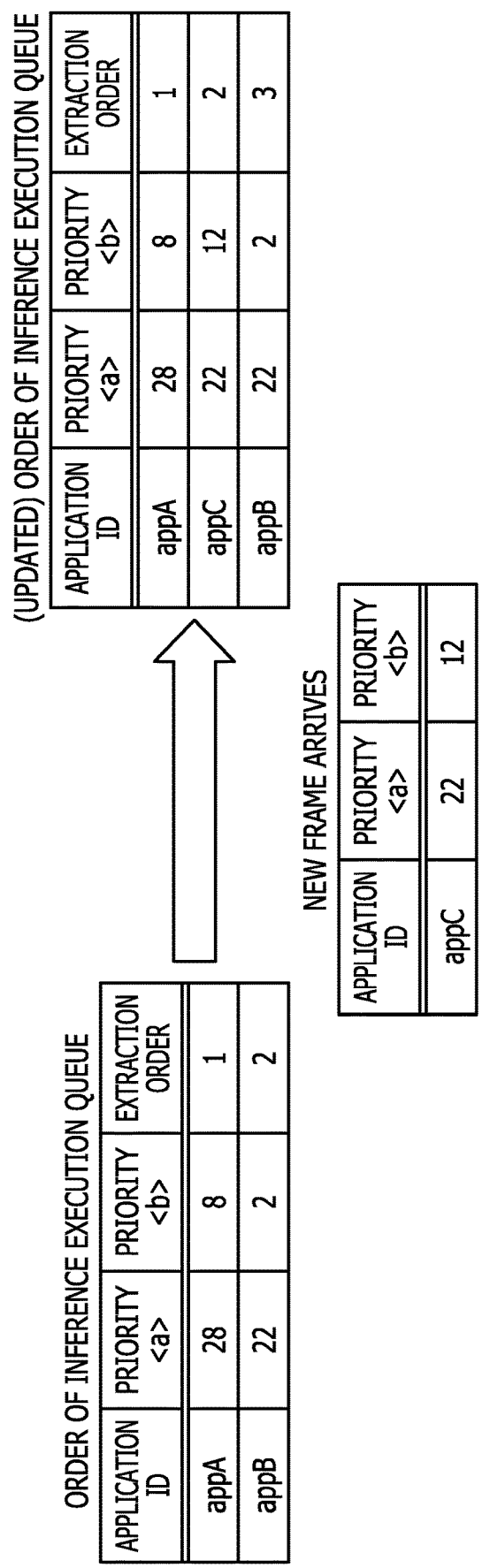
FIG. 5 is a diagram illustrating an example of an operation of an inference execution queue according to the embodiment.

FIG. 5 is a diagram illustrating an example of an operation of the inference execution queue according to the embodiment. A priority <a> illustrated in FIG. 5 is a priority converted from the first degree of similarity (similarity between the target frame and the frame at the time of the previous inference execution). A priority <b> is a priority converted from the second degree of similarity (similarity between the target frame and the immediately preceding frame). As the degree of similarity is smaller, the change is larger. Thus, each priority becomes a high priority. FIG. 5 and subsequent drawings will be described by appropriately using the priority <a> and the priority <b>.

FIG. 5 is described by using the applications 10 of "appA", "appB", and "appC" using the same model. Since "appA", "appB", and "appC" use the same model, the same inference execution queue 40 and the same inference process 50 are used.

The inference execution queue 40 inputs the frames while changing the order such that the frames having higher priority <a> and higher priority <b> are preferentially extracted. For example, the inference execution queue 40 inputs the frames while changing the order such that the frames having a smaller first degree of similarity (a larger change) and a smaller second degree of similarity (a larger change) are preferentially extracted.

As illustrated in FIG. 5, a frame of "appA" and a frame of "appB" are accumulated in the inference execution queue 40. For the frame of "appA", the priority <a> is "28" and the priority <b> is "8". For the frame of "appB", the priority <a> is "22" and the priority <b> is "2". Accordingly, in the current inference execution queue 40, the frame of "appA" having a higher priority <a> is accumulated in an extraction order earlier than the frame of "appB".

It is assumed that a new frame of "appC" arrives at the inference execution queue 40 from the agent 20. For the frame of "appC", the priority <a> is "22" and the priority <b> is "12". Since the priority <a> is "22", "appC" has an extraction order later than "appA", but has the same value as "appB". Thus, the inference execution queue 40 compares the priority <b>. Since the priority <b> is "12" and is higher than "2" of "appB", the inference execution queue 40 decides an extraction order earlier than "appB" for "appC". The inference execution queue 40 is updated in an order on a right side. For example, the inference execution queue 40 is updated in the extraction order of "appA", "appC", and "appB".

The inference execution queue 40 may change the extraction order by a combination with a deadline time such that a frame of a certain application 10 does not wait in the inference execution queue 40 for a certain time. An example of the deadline time is a time two seconds after the arrival.

[Operation of Agent]

Figure 6A:
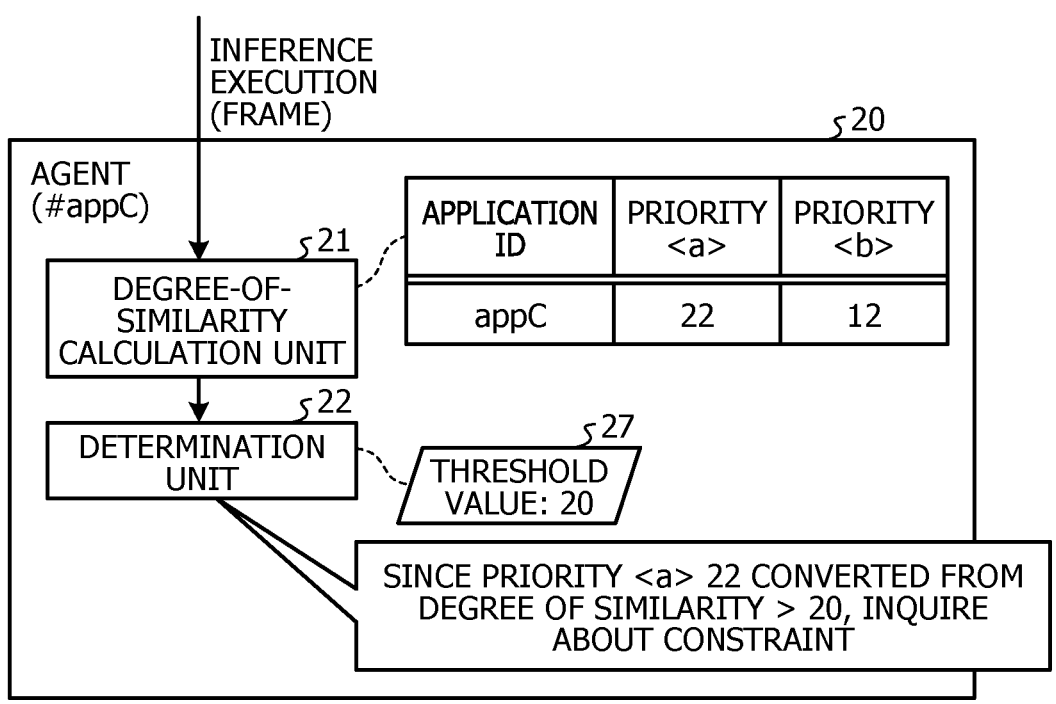
FIG. 6A is a diagram (1) illustrating an example of an operation of an agent according to the embodiment.
Figure 6B:
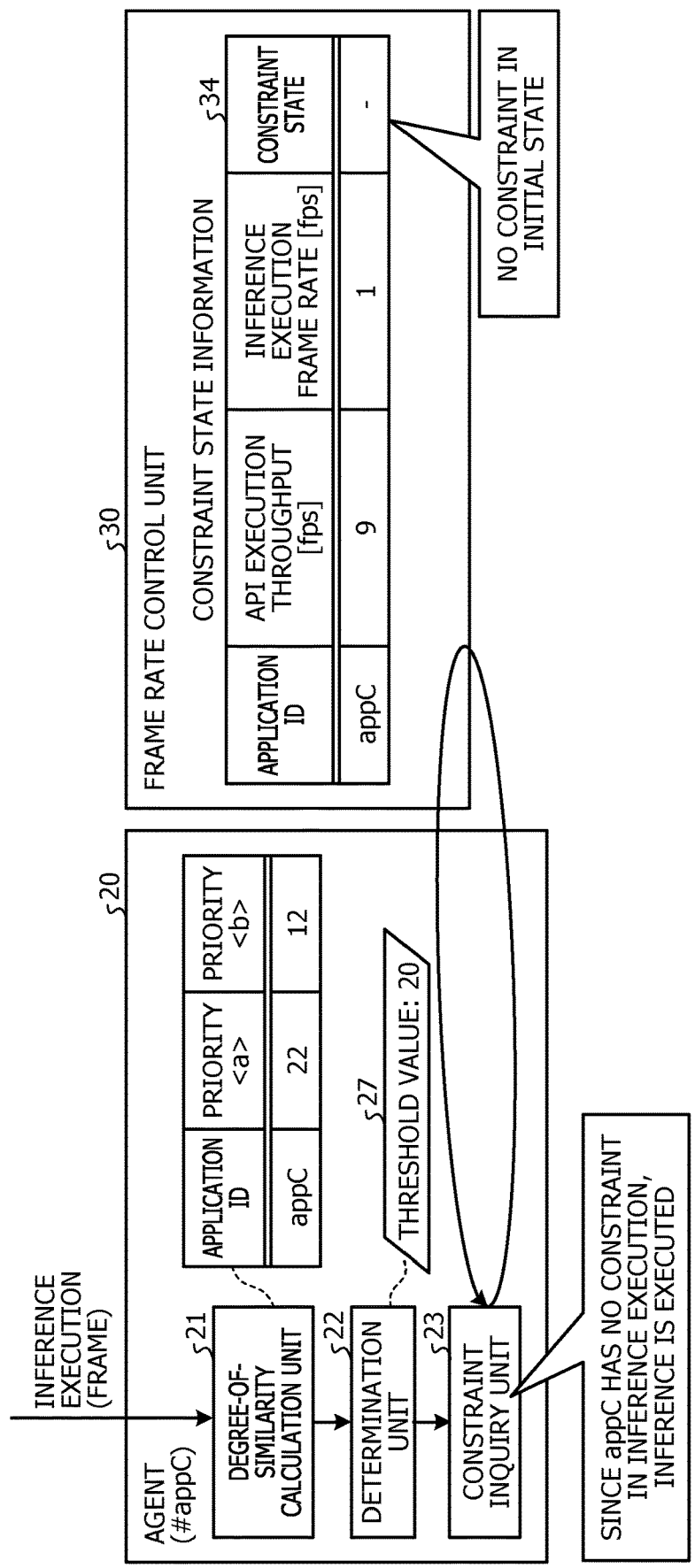
FIG. 6B is a diagram (2) illustrating an example of the operation of the agent according to the embodiment.
Figure 6C:
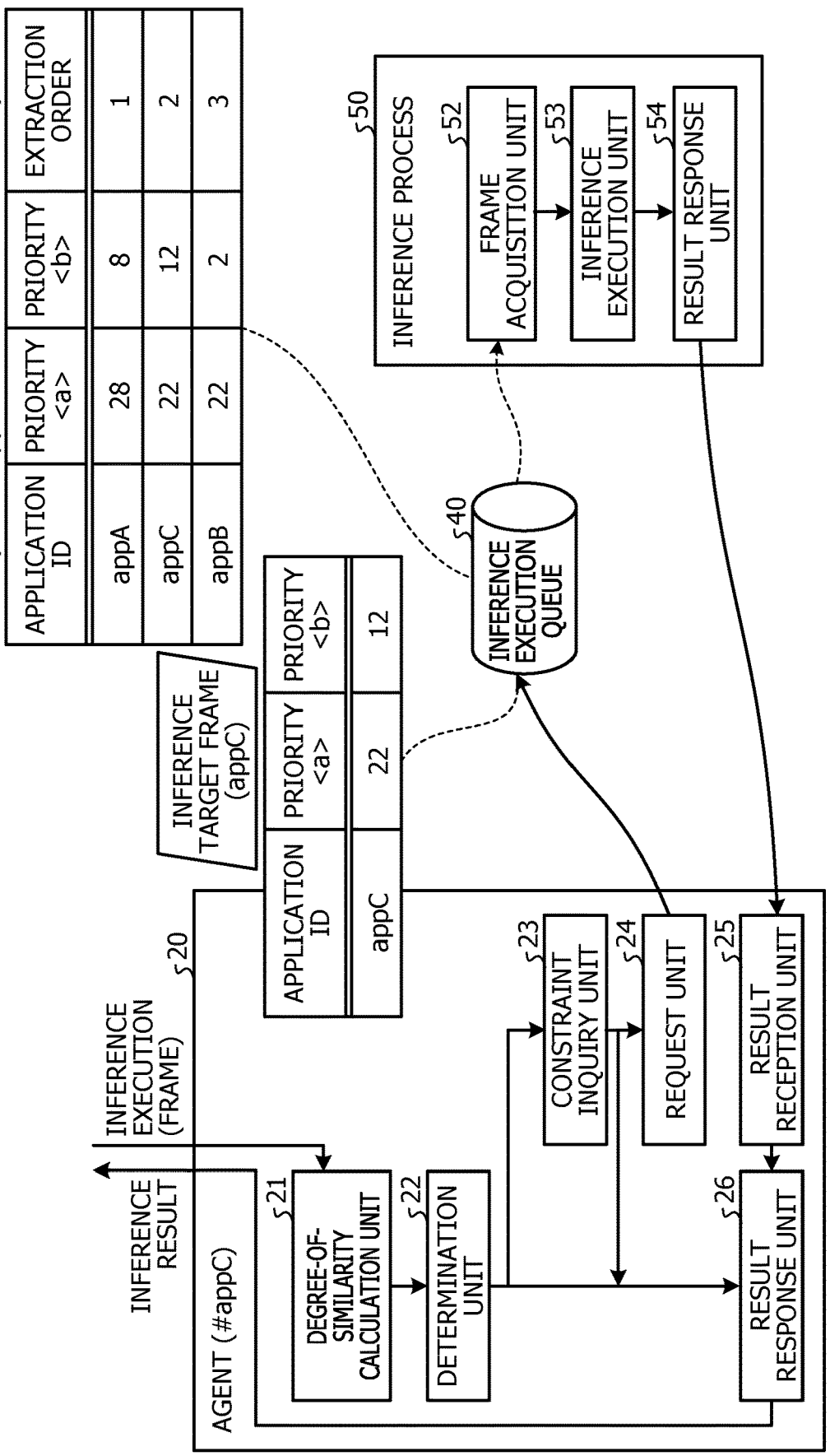
FIG. 6C is a diagram (3) illustrating an example of the operation of the agent according to the embodiment.

FIGS. 6A to 6C are diagrams illustrating an example of an operation of the agent according to the embodiment. The agent 20 of the application 10 of "appC" will be described subsequently to FIG. 5.

As illustrated in FIG. 6A, the degree-of-similarity calculation unit 21 calculates the first degree of similarity between the target frame and the frame at the time of the previous inference execution. The degree-of-similarity calculation unit 21 calculates a second degree of similarity between the target frame and the immediately preceding frame. It is assumed that the priority <a> converted from the first degree of similarity is "22" and the priority <b> converted from the second degree of similarity is "12".

The determination unit 22 compares the priority <a> with the threshold value 27, and determines whether or not there is a change equal to or larger than a certain value. When the priority <a> is higher than the threshold value 27 (when there is the change equal to or larger than the certain value), the determination unit 22 proceeds to the constraint inquiry unit 23. Since the priority <a> is higher than a threshold value "20", the determination unit 22 proceeds to the constraint inquiry unit 23.

As illustrated in FIG. 6B, the constraint inquiry unit 23 inquires of the frame rate control unit 30 about the constraint state of the inference execution for the application 10 that outputs the target frame. The constraint inquiry unit 23 inquires of the frame rate control unit 30 about the constraint state of the inference execution for "appC". Since the constraint state corresponding to "appC" is "-" indicating no constraint in the constraint state information 34, the constraint inquiry unit 23 acquires information indicating no constraint from the frame rate control unit 30.

When there is the constraint state of the inference execution obtained as the result of the inquiry, the constraint inquiry unit 23 refers to the priority <b> converted from the second degree of similarity with the immediately preceding frame, and determines to perform inference execution when the change in the short time is large. When there is not the constraint state of the inference execution obtained as the result of the inquiry, the constraint inquiry unit 23 determines to perform inference execution. Since the information indicating no constraint is acquired, the constraint inquiry unit 23 determines to perform inference execution.

As illustrated in FIG. 6C, the request unit 24 registers, in the inference execution queue 40 corresponding to the target model of the application 10, the target frame determined to perform inference execution and the priority converted from each of the first degree of similarity and the second degree of similarity. The request unit 24 registers the target frame, "22" as the priority <a>, and "12" as the priority <b> in the inference execution queue 40 corresponding to the target model of "appC".

The inference execution queue 40 inputs the frames while changing the order such that the frames having the higher priority <a> and the higher priority <b> are preferentially extracted. As illustrated in FIG. 5, in the target inference execution queue 40, the target frame of "appC" is added between "appA" and "appB".

Accordingly, the GPU server 1 may give priority to the inference processing on the frame having the large change in the shorter time among the plurality of frames arrived at the inference execution queue 40 in the same time period. For example, the GPU server 1 may avoid a decrease in the throughput of the inference execution API by giving priority a moving image in which the movement of the object in the frame is fast.

[Operation of Frame Rate Control Unit]

Figure 7A:
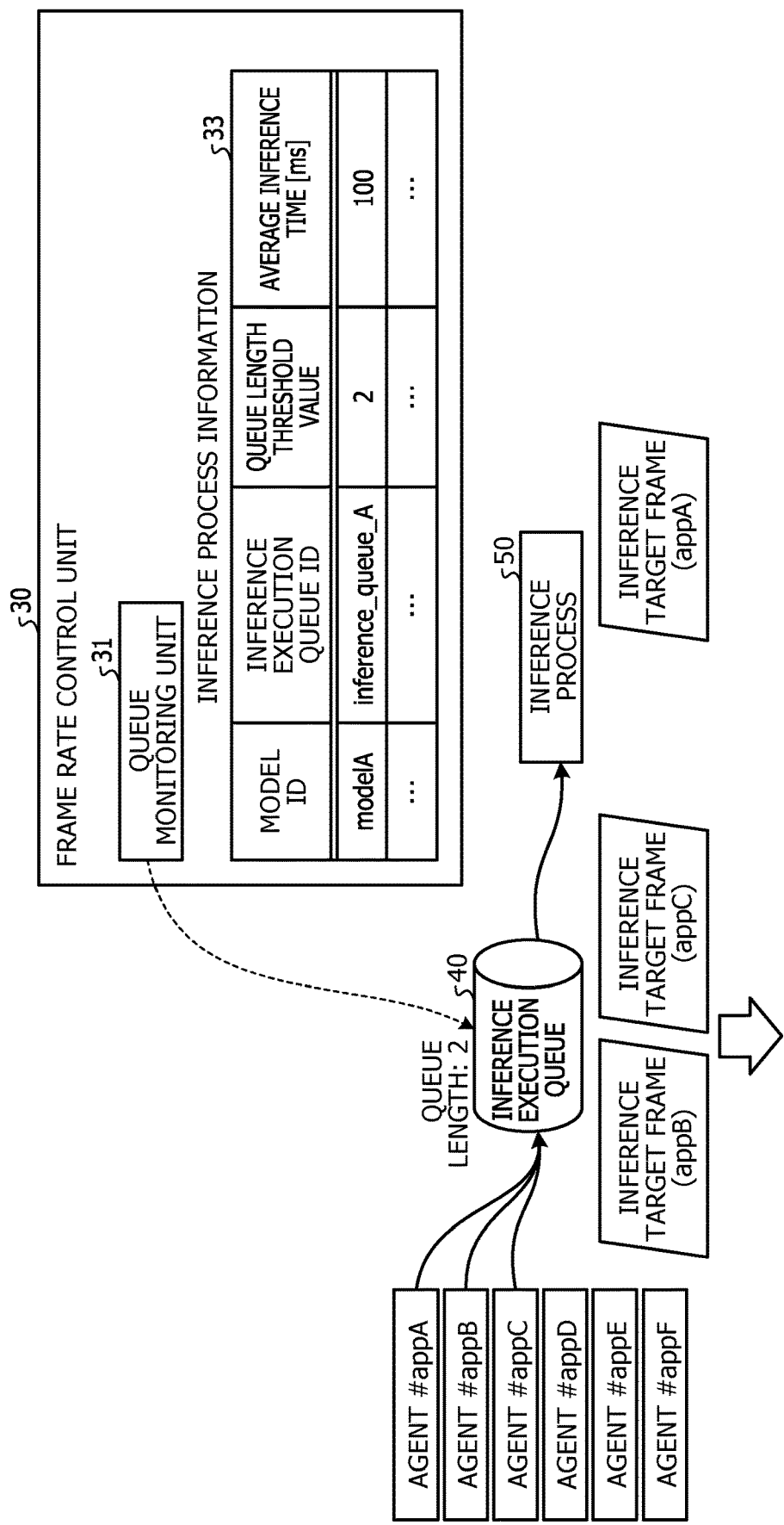
FIG. 7A is a diagram (1) illustrating an example of an operation of a frame rate control unit according to the embodiment.

FIGS. 7A and 7B are diagrams illustrating an example of an operation of the frame rate control unit according to the embodiment. It is assumed that the applications 10 of "appA", "appB", "appC", "appD", "appE", and "appF" use the same model, and use the same inference execution queue 40. The inference execution of a target frame of "appA" is being performed by the inference process 50. A target frame of each of "appB" and "appC" is accumulated in the inference execution queue 40. A target frame of each of "appD", "appE", and "appF" is before being registered in the inference execution queue 40.

As illustrated in FIG. 7A, the queue monitoring unit 31 of the frame rate control unit 30 periodically monitors the queue length of the inference execution queue 40 for each model ID. The queue monitoring unit 31 searches for the inference execution queue 40 in which the current queue length exceeds the queue length threshold value set for each model in the inference process information 33. The inference execution queue 40 of "modelA" in which the current queue length is "2" and the queue length threshold value is 2 is found.

For the found inference execution queue 40 of "modelA", the queue monitoring unit 31 refers to the inference process information 33, and calculates the maximum waiting time from the current queue length. The average inference time corresponding to "modelA" of the inference process information 33 is "100 ms". Accordingly, the queue monitoring unit 31 calculates, as the maximum waiting time, a time "200 ms" obtained by multiplying the current queue length "2" by the average inference time "100 ms".

As illustrated in FIG. 7B, the constraint decision unit 32 refers to the constraint state information 34 for the found inference execution queue 40 of "modelA" and decides the application ID that imposes the constraint on the inference execution. As an example, when the maximum waiting time calculated from the current queue length is set as a period of the frame, the constraint decision unit 32 calculates an arrival frequency (throughput) of frames per second from the maximum waiting time. Such a calculated value is a specified value used for a constraint condition. Since the maximum waiting time is "200 ms", the specified value is calculated as 5 fps (=1000 ms/200 ms).

The constraint decision unit 32 refers to the API execution throughput of the constraint state information 34, searches for an application ID larger than the specified value, and sets the constraint state of the found application ID to "presence". The API execution throughputs larger than the specified value "5" are "appE" and "appF". Accordingly, the constraint state of each of "appE" and "appF" is set to "presence". For example, the constraint decision unit 32 imposes the constraint on the inference execution on "appE" and "appF". This is because, when a frame arrives at an arrival frequency (API execution throughput) larger than the specified value, the frame overflows from the inference execution queue 40 or waits for a long period of time. As a result, the throughput of the inference execution API of the application 10 using the same inference execution queue 40 decreases by waiting for in the inference execution queue 40 of the frame. Since the API execution throughput for "appD" is "1" and is smaller than the specified value "5", the constraint decision unit 32 does not impose the constraint on the inference.

When the current queue length becomes smaller than the queue length threshold value, the constraint decision unit 32 sets the constraint state to "-" in order to cancel the constraint.

Accordingly, the GPU server 1 may inhibit concentration of timing of using the GPU that performs the inference processing by focusing on the application 10 that executes the inference processing at a higher frequency. The GPU server 1 may improve the throughput of the inference execution API of the application 10.

[Flowchart of Agent]

Figure 8:
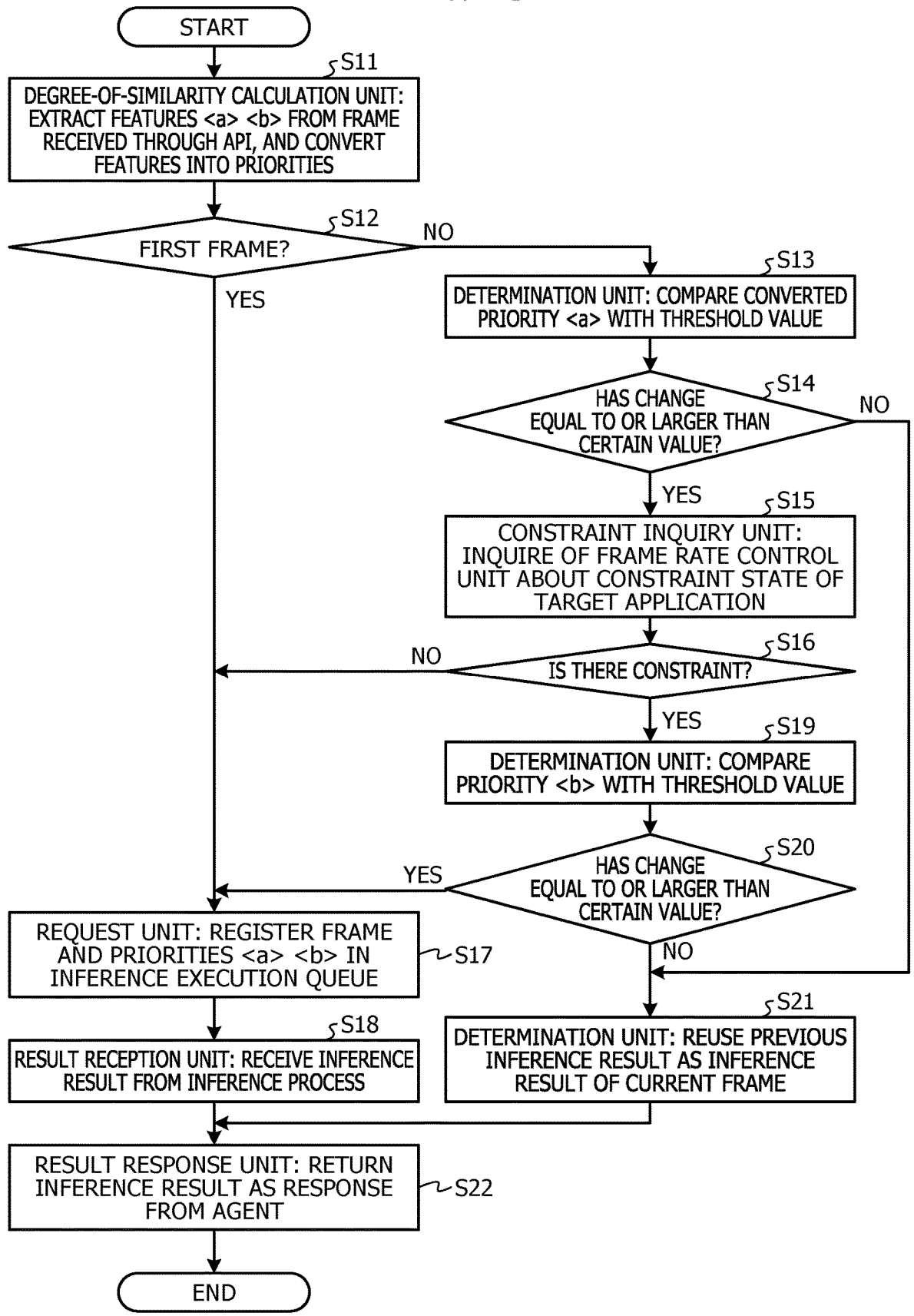
FIG. 8 is a diagram illustrating an example of a flowchart of the agent according to the embodiment.

FIG. 8 is a diagram illustrating an example of a flowchart of the agent according to the embodiment. The agent 20 is activated for each application 10 by the inference execution API. The video processing unit 11 of the application 10 delivers the target frame to the agent 20 corresponding to the application 10 through the inference execution API.

In the agent 20, the degree-of-similarity calculation unit 21 extracts features <a> <b> from the frame received through the inference execution API, and converts the features <a> <b> into the priorities (step S11). For example, the degree-of-similarity calculation unit 21 calculates the first degree of similarity between the target frame and the frame at the time of the previous inference execution. The degree-of-similarity calculation unit 21 calculates the second degree of similarity between the target frame and the immediately preceding frame. The degree-of-similarity calculation unit 21 converts the first degree of similarity and the second degree of similarity into the priority <a> and the priority <b>, respectively. The priority indicates a value such that as the degree of similarity decreases (the change increases), the priority of the inference execution increases. In the case of a first frame, since there are not the frame at the time of the previous inference execution and the immediately preceding frame, the degree-of-similarity calculation unit 21 sets the first degree of similarity and the second degree of similarity of the target frame to the minimum values (the largest changes). The degree-of-similarity calculation unit 21 converts the first degree of similarity and the second degree of similarity into the highest priority <a> and the highest priority <b>, respectively.

The determination unit 22 determines whether or not the frame is the first frame (step S12). When it is determined that the frame is the first frame (step S12; Yes), the determination unit 22 proceeds to step S17 in order to request the inference execution for the target frame. On the other hand, when it is determined that the frame is not the first frame (step S12; No), the determination unit 22 compares the converted priority <a> with the threshold value 27 (step S13).

As the result of the comparison, the determination unit 22 determines whether or not there is a change equal to or larger than a certain value (step S14). When it is determined that there is no change equal to or larger than the certain value (step S14; No), the determination unit 22 proceeds to step S21 in order to reuse the previous inference result. On the other hand, when it is determined that there is the change equal to or larger than the certain value (step S14; Yes), the constraint inquiry unit 23 inquires of the frame rate control unit 30 about the constraint state of the target application 10 (step S15).

The determination unit 22 determines whether or not there is the constraint in the inquired constraint state (step S16). When it is determined that there is not the constraint in the constraint state (step S16; No), the determination unit 22 proceeds to step S17 in order to request the inference execution for the target frame. On the other hand, when it is determined that there is the constraint in the constraint state (step S16; Yes), the determination unit 22 compares the priority <b> with the threshold value 27 (step S19).

As the result of the comparison, the determination unit 22 determines whether or not there is a change equal to or larger than a certain value (step S20). When it is determined that there is no change equal to or larger than the certain value (step S20; No), the determination unit 22 proceeds to step S21 in order to reuse the previous inference result. On the other hand, when it is determined that there is the change equal to or larger than the certain value (step S20; Yes), the determination unit 22 proceeds to step S17 in order to request the inference execution for the target frame.

In step S17, the request unit 24 registers the target frame and the priorities <a> <b> in the inference execution queue 40 (step S17). Thereafter, the result reception unit 25 receives the inference result from the inference process 50 that executes the inference processing (step S18). The result reception unit 25 proceeds to step S22.

In step S21, the determination unit 22 reuses the previous inference result as the inference result of the current frame (step S21). The determination unit 22 proceeds to step S22.

In step S22, the result response unit 26 returns, as a response from the agent 20, the inference result to the target application 10. Thereafter, the agent 20 ends the process.

[Flowchart of Frame Rate Control Processing]

Figure 9:
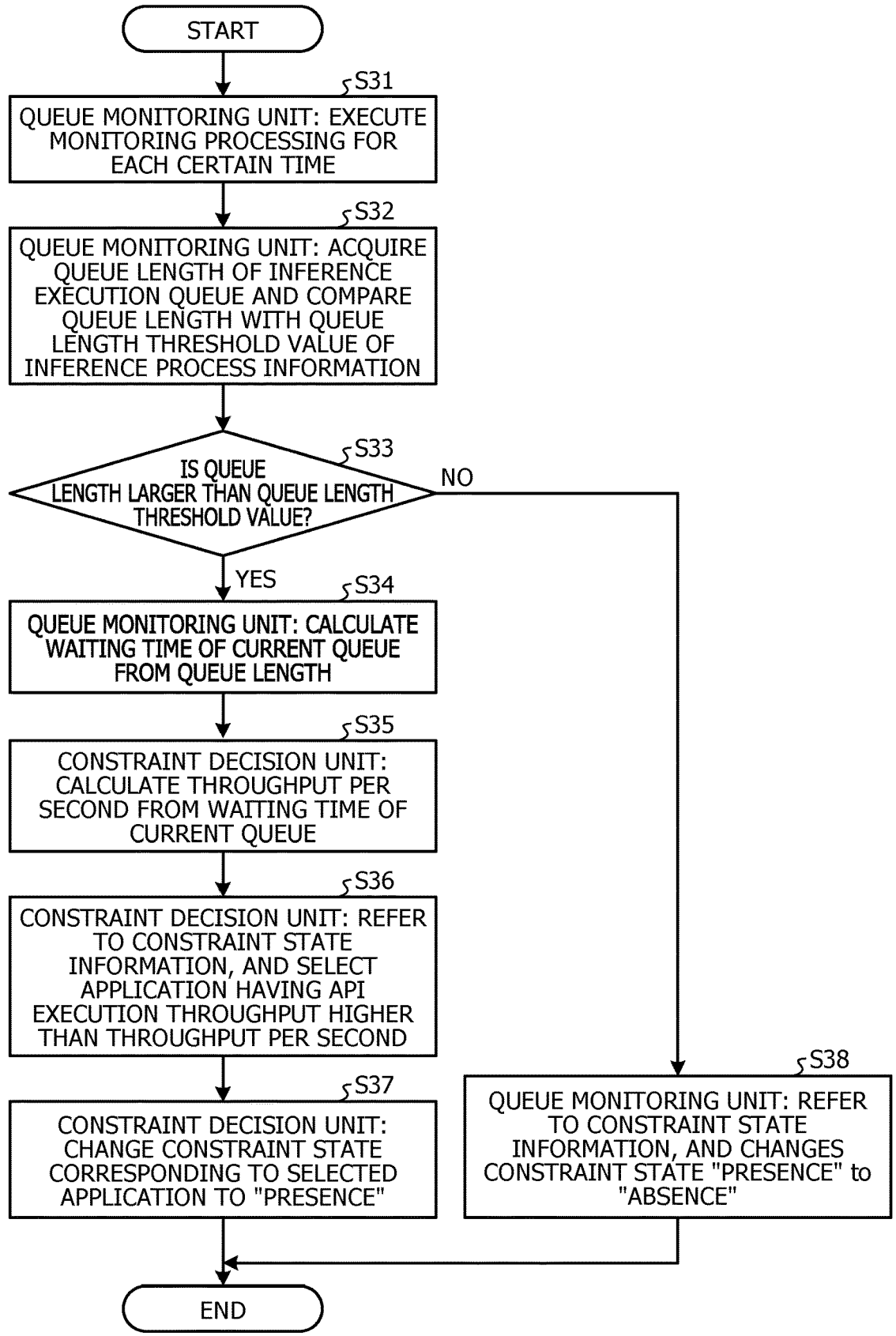
FIG. 9 is a diagram illustrating an example of a flowchart of frame rate control processing according to the embodiment.

FIG. 9 is a diagram illustrating an example of a flowchart of frame rate control processing according to the embodiment.

As illustrated in FIG. 9, the queue monitoring unit 31 executes monitoring processing for each certain time (step S31). For example, the queue monitoring unit 31 monitors the queue length for the inference execution queue 40 for each model used in the inference execution. The queue monitoring unit 31 acquires the queue length of the inference execution queue 40, and compares the acquired queue length with the queue length threshold value of the inference process information 33 (step S32).

The queue monitoring unit 31 determines whether or not the queue length is larger than the queue length threshold value (step S33). When it is determined that the queue length is larger than the queue length threshold value (step S33; Yes), the queue monitoring unit 31 calculates the waiting time of the current inference execution queue 40 from the queue length (step S34). For example, the queue monitoring unit 31 calculates, as the waiting time, a time obtained by multiplying the current queue length by the average inference time for the target model set in advance in the inference process information 33.

The constraint decision unit 32 calculates the throughput (arrival frequency) of frames per second from the waiting time of the current inference execution queue 40 (step S35). For example, the constraint decision unit 32 may calculate 1000 (ms)/waiting time (ms). The constraint decision unit 32 refers to the constraint state information 34, selects an application ID for which the API execution throughput is larger than the throughput (arrival frequency) per second (step S36).

For the constraint state information 34, the constraint decision unit 32 changes the constraint state corresponding to the selected application ID to "presence" indicating that there is the constraint (step S37). Thereafter, the constraint decision unit 32 ends the frame rate control processing.

On the other hand, when it is determined that the queue length is not larger than the queue length threshold value (step S33; No), the queue monitoring unit 31 refers to the target constraint state information 34, and changes the constraint state "presence" to "absence" (step S38). Thereafter, the constraint decision unit 32 ends the frame rate control processing.

[Flowchart of Inference Process]

Figure 10:
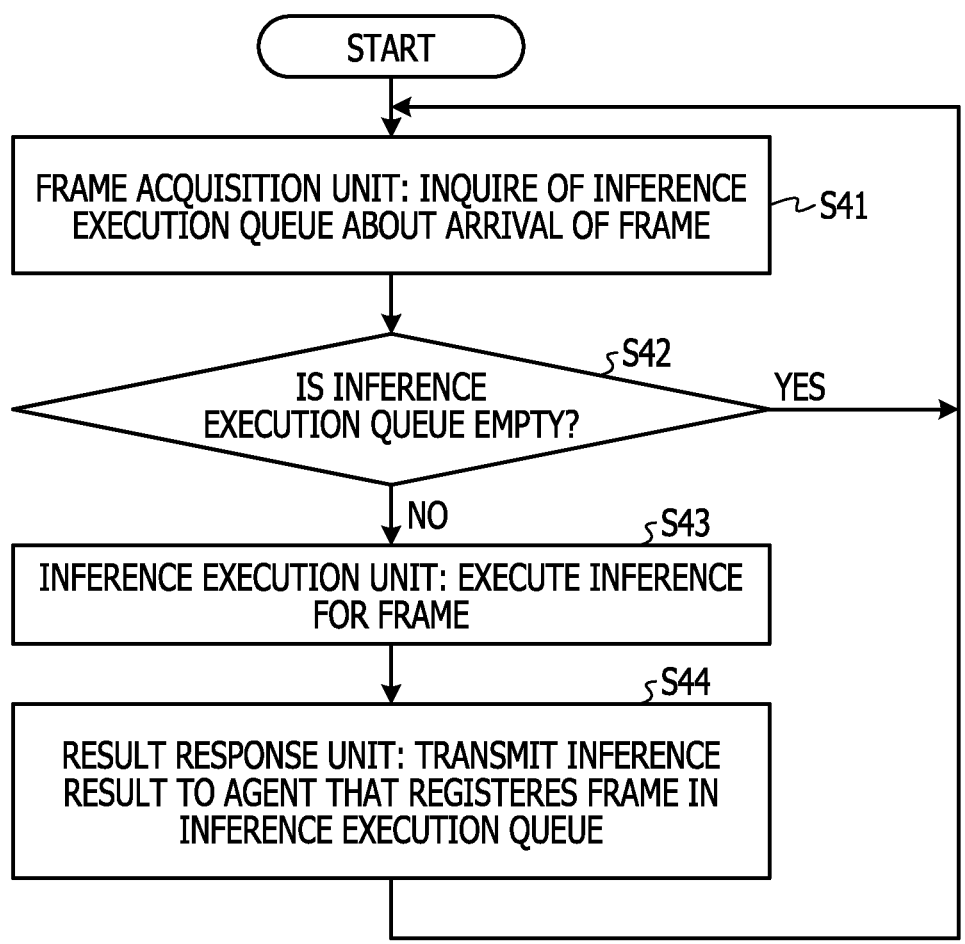
FIG. 10 is a diagram illustrating an example of a flowchart of an inference process according to the embodiment.

FIG. 10 is a diagram illustrating an example of a flowchart of the inference process according to the embodiment. The inference process 50 is activated for each model used in the inference execution. It is assumed that the model is loaded by the model loading unit 51.

The frame acquisition unit 52 inquires of the target inference execution queue 40 about the arrival of the frame (step S41). The frame acquisition unit 52 determines whether or not the target inference execution queue 40 is empty (step S42). When it is determined that the target inference execution queue 40 is empty (step S42; Yes), the frame acquisition unit 52 subsequently proceeds to step S41 in order to make an inquiry.

On the other hand, when it is determined that the target inference execution queue 40 is not empty (step S42; No), the inference execution unit 53 executes the inference processing on the frame extracted from the target inference execution queue 40 (step S43). For example, the inference execution unit 53 executes the inference processing using the GPU on the extracted frame by using the corresponding model.

After the inference execution is ended, the result response unit 54 transmits the inference result to the agent 20 that registers the target frame in the inference execution queue 40 (step S44). The result response unit 54 proceeds to step S41 in order to perform processing on a next frame.

[Effects of Embodiment]

According to the above-described embodiment, the GPU server 1 executes the inference processing using the GPU on the frames of the moving image through each application 10 for each of the plurality of applications 10. The GPU server 1 calculates the first degree of similarity between the target frame and the frame at the time of execution of previous inference processing. The GPU server 1 calculates the second degree of similarity between the target frame and the immediately preceding frame. When the inference execution queue 40 is used for waiting for the execution of the inference processing and the inference execution queue 40 that accumulates the target frame exceeds the queue length threshold value, the GPU server 1 sets the constraint on the execution of the inference processing for the target frame having the throughput larger than the specified value. The GPU server 1 decides whether or not to execute the inference processing on the target frame based on the first degree of similarity, the second degree of similarity, and the presence or absence of the constraint. According to such a configuration, the GPU server 1 may improve the throughput of the inference execution in the application 10 and increase the usage efficiency of the GPU.

According to the above-described embodiment, when the first degree of similarity is smaller than the first threshold value and there is not the constraint, the GPU server 1 decides to execute the inference processing on the target frame. According to such a configuration, since the GPU server 1 does not execute the inference processing on all the frames but executes the inference processing on the frames matching the condition, the usage efficiency of the GPU may be increased. The GPU server 1 may preferentially execute the inference processing on the frame having the large change.

According to the above-described embodiment, when the first degree of similarity is smaller than the first threshold value and there is the constraint, the GPU server 1 decides to execute the inference processing on the target frame when the second degree of similarity is smaller than the second threshold value. According to such a configuration, even when there is the constraint, the GPU server 1 may preferentially execute the inference processing on the frame having the large change in the shorter time.

According to the above-described embodiment, when the first degree of similarity is larger than the first threshold value, the GPU server 1 decides not to execute the inference processing on the target frame. According to such a configuration, since the GPU server 1 does not execute the inference processing on the frame with the small change, the throughput of the inference execution in the application 10 may be improved, and the usage efficiency of the GPU may be increased.

According to the above-described embodiment, when the inference execution queue 40 exceeds the maximum queue length, the GPU server 1 sets the constraint on the execution of the inference processing for the target frame in which the throughput is larger than the specified value. The specified value is an arrival frequency of frames per second when the waiting time until the currently accumulated frame is extracted is set as a period of frames. According to such a configuration, the GPU server 1 may suppress the execution of the frame that overflows from the inference execution queue 40 or is waiting for a long period of time in the inference execution queue 40.

[Others]

Each component included in the GPU server 1 illustrated in the drawings does not necessarily have to be physically constructed as illustrated in the drawings. For example, specific forms of separation and integration of each apparatus are not limited to those illustrated in the drawings, and all or a part thereof may be configured to be functionally or physically separated and integrated in any unit depending on various loads, usage states, and the like. For example, the request unit 24, the result reception unit 25, and the result response unit 26 may be integrated as one communication unit. The degree-of-similarity calculation unit 21 may be distributed to a calculation unit that calculates the first degree of similarity and a calculation unit that calculates the second degree of similarity. The storage unit (not illustrated) that stores the inference process information 33 and the like may be coupled via a network as an external apparatus of the GPU server 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
one or more memories; and
one or more processors coupled to the one or more memories and the one or more processors configured to:
execute inference processing using a GPU on frames of a moving image through each application for each of a plurality of applications,
acquire a first degree of similarity between a target frame and a frame at a time of execution of previous inference processing by calculating,
acquire a second degree of similarity between the target frame and an immediately preceding frame that is executed after the previous inference processing by calculating,
set a constraint on execution of inference processing for the target frame having a throughput larger than a certain value when a number of frames accumulated in a queue that is used for waiting for the execution of the inference processing and accumulates frames exceeds a certain number, the certain value being an arrival frequency of frames per second when a waiting time until a currently accumulated frame is extracted is set as a period of frames, and determine to execute the inference processing for the target frame when the first degree of similarity is smaller than a first threshold value, the constraint does not present, and the second degree of similarity is smaller than a second threshold value.

2. The information processing apparatus according to claim 1, wherein the one or more processors is further configured to acquire the first degree based on Hamming distance between a hash value obtained from the target frame and a hash value obtained from the frame at the time of execution of previous inference processing.

3. An inference execution control method for a computer to execute a process comprising:

executing inference processing using a GPU on frames of a moving image through each application for each of a plurality of applications;

acquiring a first degree of similarity between a target frame and a frame at a time of execution of previous inference processing by calculating;

acquiring a second degree of similarity between the target frame and an immediately preceding frame that is executed after the previous inference processing by calculating;

setting a constraint on execution of inference processing for the target frame having a throughput larger than a certain value when a number of frames accumulated in a queue that is used for waiting for the execution of the inference processing and accumulates frames exceeds a certain number, the certain value being an arrival frequency of frames per second when a waiting time until a currently accumulated frame is extracted is set as a period of frames; and determining to execute the inference processing for the target frame when the first degree of similarity is smaller than a first threshold value, the constraint does not present, and the second degree of similarity is smaller than a second threshold value.

4. A non-transitory computer-readable storage medium storing an inference execution control program that causes at least one computer to execute a process, the process comprising:

executing inference processing using a GPU on frames of a moving image through each application for each of a plurality of applications;

acquiring a first degree of similarity between a target frame and a frame at a time of execution of previous inference processing by calculating;

acquiring a second degree of similarity between the target frame and an immediately preceding frame that is executed after the previous inference processing by calculating;

setting a constraint on execution of inference processing for the target frame having a throughput larger than a certain value when a number of frames accumulated in a queue that is used for waiting for the execution of the inference processing and accumulates frames exceeds a certain number, the certain value being an arrival frequency of frames per second when a waiting time until a currently accumulated frame is extracted is set as a period of frames; and determining to execute the inference processing for the target frame when the first degree of similarity is smaller than a first threshold value, the constraint does not present, and the second degree of similarity is smaller than a second threshold value.

* * * * *